No. 889,978. PATENTED JUNE 9, 1908.
A. SHUMAN.
WIRE GLASS.
APPLICATION FILED AUG. 10, 1906.

Attest
P. M. Kelly.
Albert W. Stellwag.

Inventor
Arno Shuman,
By his atty.

UNITED STATES PATENT OFFICE.

ARNO SHUMAN, OF CONNELLSVILLE, PENNSYLVANIA, ASSIGNOR TO THE CONTINUOUS GLASS PRESS COMPANY, A CORPORATION OF PENNSYLVANIA.

WIRE-GLASS.

No. 889,978.      Specification of Letters Patent.      Patented June 9, 1908.

Application filed August 10, 1906. Serial No. 329,976.

*To all whom it may concern:*

Be it known that I, ARNO SHUMAN, of Connellsville, county of Fayette, State of Pennsylvania, have invented an Improvement in Wire-Glass, of which the following is a specification.

My invention has reference to wire glass and consists of certain improvements which are fully set forth in the following specification and shown in the accompanying drawings which form a part thereof.

The object of my invention is to provide a construction of wire glass which will retain its shape in cases of intense heat where the glass would soften or become greatly crushed. The giving to the wire glass properties of this character, insures it embodying exceptionally desirable fire retarding qualities.

My invention consists in providing the glass sheet with a wire meshed center embedded in the glass and formed of an hexagonal or open mesh, combined with a series of parallel longitudinal straight wires incorporated into the hexagonal or open mesh and preferably extending through the twisted portions thereof.

My invention will be better understood by reference to the drawings, in which

Figure 1:
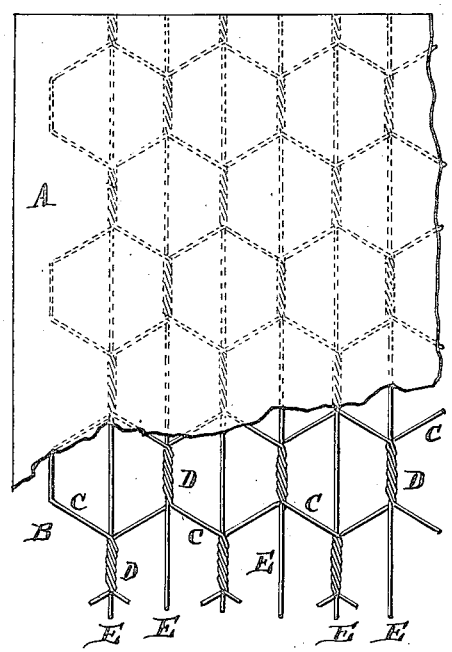
Figure 2:
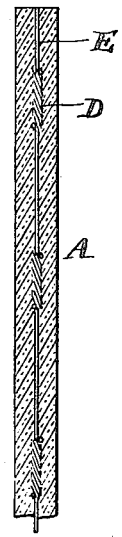

Figure 1 is a plan view of a piece of wire glass embodying my invention; and Fig. 2 is a transverse sectional elevation of the same.

A is the sheet of glass and has embedded within it a wire meshed sheet B of peculiar construction. This wire sheet consists of a series of wires C C twisted together as at D D to form the usual hexagonal mesh, combined with the series of longitudinal wires E E which are held in place by the twisted portions D D of these hexagonal mesh. In this manner the longitudinal parallel wires E E are firmly tied in place and act as braces for each hexagonal mesh. They also lie in the direction in which the glass is rolled, namely in the direction of the length of the sheet. The advantage of this wire center is to make the wire glass greatly stronger than where the ordinary hexagonal mesh is employed, both in direction of length and width. In cases where crushing of the glass occurs, the mesh is of such form as to maintain the integrity of the area of the sheet, and in those cases where intense heat melts the glass or renders it pliable, non-extensibility of the wire center prevents the distortion of the sheet and sustains its weight so that it acts as an excellent fire retarder. If the straight wire E were not employed, it is evident that the softening of the glass would permit distortion of the hexagonal mesh; but by having these straight parallel wires E in the metallic center, the softened glass would hang straight up and down upon them and also be supported by the hexagonal mesh which is held from distortion by the said wire E.

It is also evident that while the greatest strength due to the wires E is in the direction of their length, it will nevertheless be seen that their bracing action to the hexagonal meshes acts to strengthen the sheet greatly in the direction of its width also. It is evident that while the longitudinal wires E should divide all of the meshes to obtain the best results, I do not restrict myself in this respect as the supporting action would be accomplished with a smaller number of such longitudinal wires. By shortening the twisted parts D the open mesh of the sheet B would more nearly approximate a diamond mesh.

I have shown the most desirable form and manner of making the metallic center B, but it is to be understood that it may be reasonably varied without departing from the spirit of the invention.

Having now described my invention what I claim as new and desire to secure by Letters Patent, is:

1. A sheet of wire glass having a metal center formed of an open hexagonal mesh combined with a series of parallel straight wires united to the wires forming the hexagonal mesh and dividing said octagonal meshes for supporting the weight of the glass when held vertically at the top.

2. A sheet of wire glass having a metal center formed of open mesh wire combined with parallel wires extending across the open parts of the meshes and embedded throughout the full length of the glass.

3. A sheet of wire glass having a metal center formed of open mesh wire combined with parallel wires extending across the open parts of the meshes and joined to the wires forming the open meshes and of a length equal to the total length of the glass sheet.

4. A sheet of wire glass having a metal center formed of hexagonal meshes the connecting wires of which are twisted together, combined with a series of parallel longitudinal wires dividing the meshes and tied in place by the twisted portions and completely embedded in the glass throughout its length.

5. A sheet of wire glass having a metal center composed of a series of wire portions connected together and diagonally arranged to form an open mesh, combined with longitudinal parallel straight wires arranged across the open meshes and wholly embedded in the glass to constitute part of the metal center.

In testimony of which invention, I have hereunto set my hand.

ARNO SHUMAN.

Witnesses:
K. WILHELM KÖSSER,
AUG. C. WEISSKOPF.